UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

TUNGSTEN PURIFICATION.

1,026,428.     Specification of Letters Patent.     Patented May 14, 1912.

No Drawing.     Application filed September 23, 1908. Serial No. 454,450.

*To all whom it may concern:*

Be it known that I, WILLIAM D. COOLIDGE, a citizen of the United States, residing at Schenectady, in the county of Schenectady, State of New York, have invented certain new and useful Improvements in Tungsten Purification, of which the following is a specification.

When a carbon filament lamp wears out it does so as the result of two distinct actions, first blackening of the globe, and second, increase in the resistance of the filament. Now it happens that a tungsten lamp filament does not increase in resistance during life and consequently the gradual decrease in candle power during most of its normal life is due entirely to blackening of the globe.

As a result of a long series of experiments which I need not here discuss, I have found that the principal cause of blackening in tungsten lamps as now commercially manufactured is the presence of small quantities of iron or iron compounds associated with the tungsten of the filament. The proportion of iron in these filaments is very small when expressed in percentages, but nevertheless it can be detected by chemical methods.

It is very easy to understand how it happens that iron is associated with tungsten, if we remember that tungsten is ordinarily obtained from iron ore. The difficulty of precipitating and washing very fine material is well understood by chemists and no doubt explains why some iron, probably in the form of an oxid remains with the tungsten to the detriment of incandescent lamps made therefrom. Of course, it is reasonable to suppose that impurities other than iron are also present in small quantities in the tungsten, but fortunately these others come out during the various stages of the process by which that tungsten is made into finished lamp filaments. Thus, if carbon is present, it comes out during the finishing or high heat treatment to which such filaments are ordinarily subjected. Copper comes out even more easily, probably by direct vaporization. Manganese also comes out easily. With the possible exception of molybdenum which can, however, easily be eliminated by well known chemical treatment, iron is the only impurity, so far as I have yet determined, remaining behind with the tungsten of the finished lamp filaments.

My present invention contemplates the introduction into the processes of manufacture heretofore known, of a step whereby the tungsten is so purified that when mounted as filaments in incandescent lamps it will not blacken the globe to any appreciable extent. Although I base my improvement on the hypothesis, that its success is due to the removal of iron or iron compounds I do not wish to be limited by any theory whatever. The important point is that by following the process hereinafter described better and more durable tungsten lamps can be made.

According to general practice, metallic tungsten is made by reducing the trioxid of tungsten with hydrogen. This oxid is produced by precipitating a dilute ammonium tungstate solution with strong hydrochloric acid. The yellow powder so obtained is very fine and, by the exercise of proper precaution is relatively pure. As I have above indicated, it contains some iron or iron compounds and may also contain other impurities. If now, this trioxid be reduced with hydrogen according to common practice, the resulting tungsten powder will also be very fine and will also contain substantially all the impurities originally present in the oxid. It is at this stage in the process that I introduce the additional step contemplated by my present invention. This step consists in heating the tungsten in a vacuum to such a temperature as to completely vaporize all the iron or iron oxid. By the use of a vacuum during this heat treatment, the temperature need not be very high. A furnace suitable for this treatment is shown in United States Patent to Arsem, No. 785,535, issued March 21st, 1905, though in place of the graphite heater there shown I may, if desired, substitute a tungsten heater. I find that this heat treatment has a tendency to coarsen the tungsten, and in cases where this is objectionable I may reoxidize the tungsten by burning in air then dissolve in ammonia and reprecipitate and then again reduce with hydrogen. This yields a product free from iron and having the proper degree of fineness. When such purified tungsten is made into filaments by any of the processes now well known in the art, it yields a filament which will operate at high efficiency for a long time without blackening the globe. Although it is not easy to estimate the percentage of iron removed by this firing treatment, it is safe to say that it must be very small. It could not be as much as 3%, for this amount of iron will cause a lamp to blacken even before sealing off from the pump. Even one-half of one per cent. iron will make the filament blacken the globe in two hours. Since tungsten filaments, as heretofore made, run commercially for a much longer time than this without blackening, it seems safe to say that the percentage of iron removed by my improved process is considerably smaller than one-half of one per cent.

As a modification of the procedure above set forth I may introduce the special firing treatment just before reducing the yellow oxid. By this I mean that I may fire the yellow oxid in the vacuum furnace to the requisite temperature and thereby take out the iron before even producing the metallic tungsten. This procedure has the advantage of yielding fine tungsten without reoxidizing as described in the other modification of my process.

What I claim as new and desire to secure by Letters Patent of the United States, is—

1. The method for the purification of raw material containing iron for tungsten filament manufacture which consists in firing the raw material to a temperature below the fusing point of tungsten but sufficient to remove iron and its compounds.

2. The method for the purification of raw material containing iron for tungsten filament manufacture which consists in removing iron from the material by firing in a vacuum at a temperature below the fusing point of tungsten.

3. The method for the purification of powdered tungsten containing iron for tungsten filament manufacture which consists in firing the powdered tungsten in a vacuum at a temperature below the fusing point of tungsten but sufficient to insure vaporization of iron and its compounds.

In witness whereof, I have hereunto set my hand this 21st day of September, 1908.

WILLIAM D. COOLIDGE.

Witnesses:
BENJAMIN B. HULL,
MARGARET E. WOOLLEY.